No. 787,195. PATENTED APR. 11, 1905.
E. LEADBEATER.
AUTOMATIC GAS SAFETY VALVE MECHANISM.
APPLICATION FILED AUG. 25, 1904.
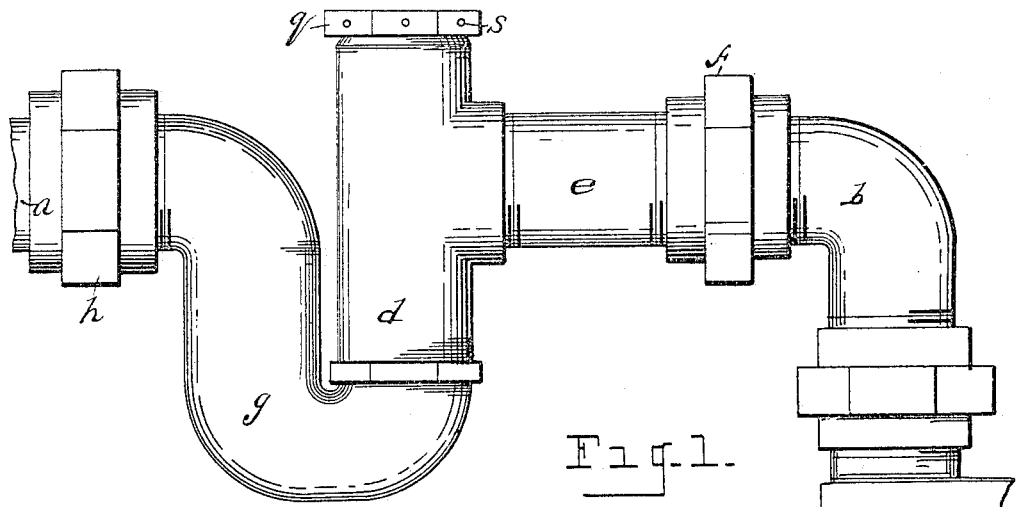
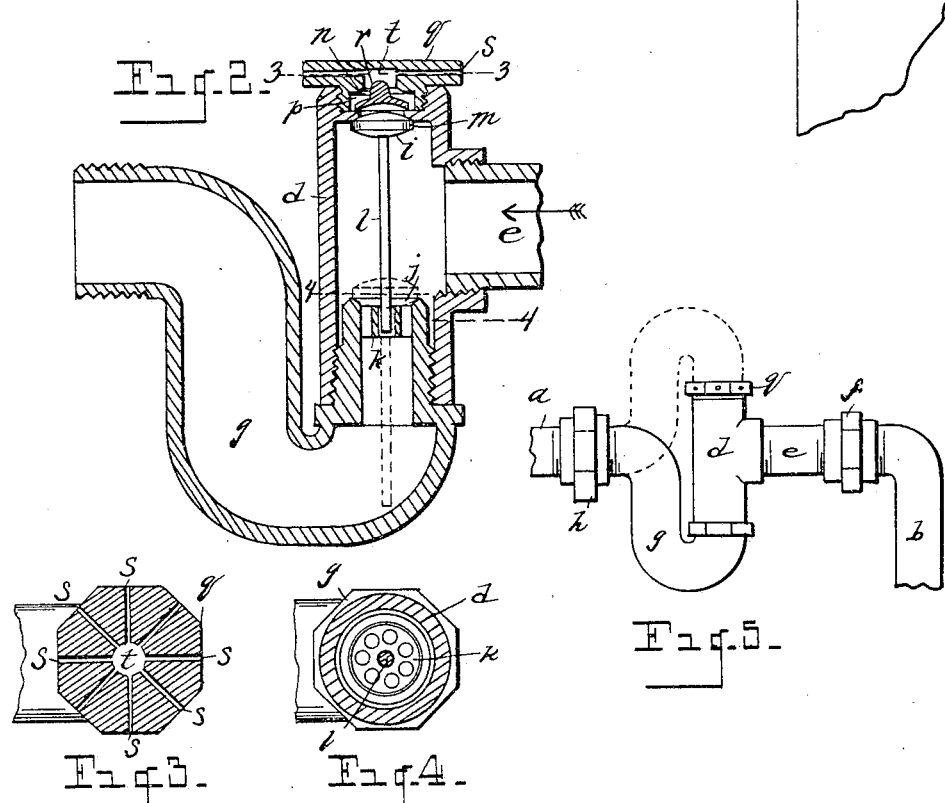
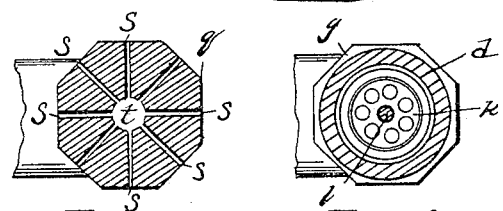

No. 787,195. Patented April 11, 1905.

UNITED STATES PATENT OFFICE.

EDWARD LEADBEATER, OF DETROIT, MICHIGAN.

AUTOMATIC GAS-SAFETY-VALVE MECHANISM.

SPECIFICATION forming part of Letters Patent No. 787,195, dated April 11, 1905.

Application filed August 25, 1904. Serial No. 222,067.

*To all whom it may concern:*

Be it known that I, EDWARD LEADBEATER, a citizen of the United States, residing at Detroit, county of Wayne, State of Michigan, have invented a certain new and useful Improvement in Automatic Gas-Safety-Valve Mechanism, of which the following is a specification, reference being had to the accompanying drawings, which form a part of this specification.

My invention has for its object a gas-safety-valve mechanism; and it consists of the construction, combination, and arrangement of devices and appliances hereinafter specified and claimed, and illustrated in the accompanying drawings, in which—

Figure 1 is a view in side elevation, illustrating the features of my invention. Fig. 2 is a view in vertical section through the valve mechanism. Fig. 3 is a view in section on the line 3 3, Fig. 2. Fig. 4 is a view in section on the line 4 4, Fig. 2. Fig. 5 is a view similar to Fig. 1, but showing in dotted lines the valve mechanism inverted for the purpose hereinafter named.

On various occasions and in various places it has been found that illuminating-gas pressure has given way, and such an occurrence is liable to occur in the middle of the night, when the occupants of a building are asleep, in which case it is readily seen that any gas-jets which may be left ignited would go out, leaving the fixture open, so that when the gas-pressure is restored there will inevitably be, unless some particular precautionary measure is taken, an escape of gas liable to do great harm to life.

It is the purpose of my invention to provide means for overcoming any such liability—*i. e.*, of gas escaping from an open gas-fixture should the gas-pressure fail while the occupants of a dwelling might be asleep and then the pressure be restored.

I accomplish my object in the following manner.

In the drawings, $a$ and $b$ represent two portions of a gas-pipe leading to a gas fixture or fixtures from a meter $c$. Between the adjacent ends of the two portions of the pipe $a$ $b$ I locate a valve-case and its valve mechanism, said case preferably formed with an inclosing wall $d$ to form an interior chamber into which a connection $e$ communicates, a union $f$ being preferably located between the connection $e$ and the portion of the pipe $b$. With one end of the wall $d$ is engaged an elbow $g$, said elbow communicating with the portion $a$ of the gas-pipe through an intervening union $h$. The chamber within the wall $d$ communicates with the elbow $g$, the communication being controlled by a valve $i$, seating upon the inner end of the elbow within the wall $d$. Within the inner end of the elbow adjacent to the valve-seat $j$ is an open diaphragm or spider $k$, formed with a central opening to receive the stem $l$ of the valve and guide the valve in its movements, said diaphragm or spider formed with openings therethrough for the passage of the gas. Toward the upper end of the wall $d$ of the valve-case I provide also an additional seat $m$, against which the valve $i$ may seat, said valve being a double-seated valve. Above the seat $m$ is a chamber $p$, formed within a perforated cap $q$, said chamber communicating, through the seat $m$, with the chamber within the wall $d$ when the valve opens said communication. Within the chamber $p$ is an additional valve $r$, the valve $r$ seating against the seat $n$ in said cap. The cap is preferably provided with a series of radial perforations $s$, all leading into the chamber $p$, the valve $r$ controlling the communication of said channels into said chamber. To this end the cap may be constructed with a chamber $t$, into which the channels $s$ converge. The valve $i$ is made of very light weight, so that the pressure of the gas when flowing normally through the pipes $a$ and $b$ will hold the valve off from the seat $j$ and upon the seat $m$, leaving a free communication through the valve-case, so that gas may pass from the meter through the pipe $b$, the valve mechanism, and the pipe $a$ to the fixtures. While there is normal pressure of the gas in the gas-pipe, the valve $i$ will maintain its position upon the seat $m$, said valve being held by the normal gas-pressure in lifted position off from the seat $j$. It will readily be seen, however, that as soon as the gas-pressure fails within the gas-pipes the valve $i$ will drop to its seat $j$. Should the gas-pressure be restored, the gas would of course enter through the connection $e$ into the chamber of the case of the valve and above the valve seated upon the seat $j$. There would of course be no pressure in the portion $a$ of the gas-pipe under such conditions or in the elbow $g$, while when the pressure was restored said pressure would be exerted upon the top of the valve to thereby hold the valve in closed position upon its seat $j$. Upon the pressure being restored, therefore, in the gas-pipes the supply of gas would be effectually cut off after the restoration of the pressure from the fixtures, so that no gas could escape therefrom. In order to secure the normal working of the valve $i$, it is found desirable that any pressure should be relieved upon the upper surface of said valve, and for this reason I provide the perforated cap $q$ with its interior chamber and channels opening to the atmosphere, the communication of said channels with the chamber of the cap being controlled, as above observed, by the valve $r$. It is obvious that when gas-pressure was restored upon the upper surface of the valve $i$, seated upon the seat $j$, the valve $r$ would prevent any escape of gas through the channels $s$ of the cap, the valve $r$ resting upon its seat $n$.

In order to seat the valve mechanism in normal working order again, I prefer to provide the unions $f$ and $h$. By loosening such unions after turning off the gas passing from the meter the valve-case $d\ g$ may readily be reversed in position, as indicated in dotted lines, Fig. 5, and when in said position the valve $i$ will of course seat upon the seat $m$, allowing the free communication through the connection $e$ and the valve-seat $j$ with the elbow $g$ and pipe $a$. The gas-pressure will then of course be normal in both the pipes $a\ b$, after which the valve-case may be restored to its normal position. (Shown in full lines in Figs. 1 and 5.)

I find that the valve $i$, spun from aluminium, serves the purpose of my invention.

The operation of the safety-valve mechanism will now be understood.

What I claim as my invention is—

1. A gas-safety-valve mechanism embodying in combination with a gas-pipe a valve-case interposed in said pipe between the gas-meter and the lighting-fixtures, and a valve located wholly within said case to control the communication of the pipe through the valve-case, said valve constructed of a material having light specific gravity to be normally held unseated by the normal pressure of gas in said pipe to open communication through the case and to automatically close said communication when the normal gas-pressure within the pipe is removed, said valve held in closed position by the pressure of the gas when gas-pressure is restored in the meter until said valve is returned to its normal position.

2. A gas-safety-valve mechanism embodying in combination with a gas-pipe, a valve-case interposed in said pipe between the gas-meter and the lighting-fixtures, a valve in said case of light specific gravity to control the communication of the pipe through the case, said valve constructed to be normally held unseated by the normal pressure of gas in said pipe to open said communication and to automatically close said communication when the normal gas-pressure is removed, and means permitting a relief of pressure from the upper surface of said valve when in open position, said valve held in closed position by the pressure of the gas when gas-pressure is restored in the meter until said valve is returned to its normal position.

3. A gas-safety-valve mechanism embodying in combination with a gas-pipe, a valve-case interposed in said pipe between the gas-meter and the lighting fixtures, and a valve of light specific gravity located wholly within said case to control the communication of the pipe through the valve-case, said valve constructed to be normally held unseated by the normal pressure of gas in said pipe to open communication through the case and to automatically close said communication when the normal gas-pressure within the pipe is removed, said case being reversible in its position in said pipe, for the purpose described, said valve held in closed position by the pressure of the gas when gas-pressure is restored in the meter until said valve is returned to its normal position.

4. A gas-safety-valve mechanism embodying in combination with a gas-pipe, a valve-case interposed in said pipe between the gas-meter and the lighting-fixtures, a valve of light specific gravity located wholly within said case to control the communication of the pipe through the valve-case, said valve constructed to be normally held unseated by the normal pressure of gas in said pipe, and to seat by its own gravity when the normal gas-pressure is removed.

5. A gas-safety-valve mechanism embodying in combination with a gas-pipe a valve-case interposed in said pipe between the gas-meter and the lighting-fixtures, a double-seated valve of light specific gravity within said case to control the communication of the pipe through the case, said valve constructed to be normally held unseated by the pressure of gas in said pipe to open communication through said case when the gas-pressure is normal within said pipe, said case provided with a chamber toward the upper end thereof communicable with the atmosphere, and means to control said latter communication.

6. A gas-safety-valve mechanism embodying in combination with a gas-pipe a valve-case interposed in said pipe between the gas-meter and the lighting-fixtures, said case constructed with an interior chamber having valve-seats toward opposite ends thereof, a valve of light specific gravity located wholly within said case to seat on either of said seats, said valve constructed to be normally held unseated to open communication through said case when normal gas-pressure is present in said pipe and to automatically close said communication when the normal gas-pressure is removed.

7. A gas-safety-valve mechanism embodying in combination with a gas-pipe a valve-case interposed in said pipe between the gas-meter and the lighting-fixtures, said case provided with an interior chamber and with a channeled cap communicable with said chamber and with the atmosphere, a double-seated valve in said case of light specific gravity located wholly within the case to control the communication of the pipe through said case, and the communication of said chamber with the channeled cap, and an additional valve to control the communication through the cap with the atmosphere.

8. A gas-safety-valve mechanism embodying in combination with a gas-pipe a valve-case interposed in said pipe between the gas-meter and the lighting-fixtures constructed to communicate with the atmosphere, a double-seated valve in said case located wholly therewithin, and constructed from material having light specific gravity to control the communication of the pipe through the valve-case, and additional means to control the communication of the case with the atmosphere.

9. A gas-safety-valve mechanism embodying the combination with a gas-pipe of a valve-case provided with two double-seated communicating chambers, a double-seated valve normally held unseated by the normal pressure of the gas in said pipe to control communication between said chambers, and to control the communication of the pipe through the valve-case, one of said chambers communicable with the atmosphere, and additional means to control said communication with the atmosphere.

10. A gas-safety-valve mechanism embodying in combination with a gas-pipe a valve-case interposed in said pipe between the gas-meter and the lighting-fixtures constructed with a wall to form a valve-chamber and with a detachable elbow communicable with said chamber, said wall and said elbow provided with valve-seats toward opposite ends of said chamber, a chamber above the seat of said wall communicable with the atmosphere, a valve in the first-mentioned chamber to control the communication of the pipe through the valve-case, and the communication of the chambers, and an additional valve to control the communication of the last-mentioned chamber with the atmosphere.

11. A gas-safety-valve mechanism embodying in combination with a gas-pipe a valve-case provided with two communicating chambers, a double-seated valve in one of said chambers normally held unseated by the pressure of gas in said pipe to control communication between said chambers and to control the communication of the pipe through the valve-case, one of said chambers communicable with the atmosphere, and means to control said communication with the atmosphere, said elbow adjacent to its valve-seat provided with a guide for the stem of the valve, said valve-case being reversible in its position in said pipe for the purpose described.

12. A gas-safety-valve mechanism embodying in combination with a gas-pipe, a valve-case interposed in said pipe between the gas-meter and the lighting-fixtures, a valve in said case of light specific gravity located wholly within the case to control the communication of the pipe through the valve-case, said valve constructed to be normally held unseated by the normal pressure of gas in said pipe and to seat by gravity when the normal gas-pressure is removed, said valve held in closed position by the pressure of the gas when the gas-pressure is restored in the meter, until the valve has been returned to its normal position, said valve being wholly contained within the valve-case.

13. A gas-safety-valve mechanism embodying the combination with a gas-pipe of a valve-case provided with two double-seated communicating chambers, a double-seated valve made of light material normally held unseated by the normal pressure of the gas in said pipe to control communication between said chambers, and to control the communication of the pipe through the valve-case, one of said chambers communicable with the atmosphere, and additional means to control said communication with the atmosphere, said valve held in closed position by the pressure of the gas when gas-pressure is restored in the meter until said valve is returned to its normal position.

14. A gas-safety-valve mechanism embodying in combination with a gas-pipe a valve-case interposed in said pipe between the gas-meter and the lighting-fixtures constructed with a wall to form a valve-chamber and with a detachable elbow communicable with said chamber, said wall and said elbow provided with valve-seats toward opposite ends of said chamber, a chamber above the seat of said wall communicable with the atmosphere, a valve in the first-mentioned chamber held normally unseated by the normal pressure of the gas to control the communication of the pipe through the valve-case and the communication of the chambers, and an additional valve to control the communication of the last-mentioned chamber with the atmosphere, said valve held in closed position by the pressure of the gas when gas-pressure is restored in the meter until said valve is returned to its normal position.

In testimony whereof I have signed this specification in the presence of two subscribing witnesses.

EDWARD LEADBEATER.

Witnesses:
N. S. WRIGHT,
Mrs. E. LEADBEATER.